US010055279B2

(12) United States Patent
Kawato et al.

(10) Patent No.: US 10,055,279 B2
(45) Date of Patent: Aug. 21, 2018

(54) SEMICONDUCTOR INTEGRATED CIRCUIT FOR COMMUNICATION, STORAGE APPARATUS, AND METHOD FOR MANAGING FAILURE IN STORAGE APPARATUS

(71) Applicant: HITACHI, LTD., Tokyo (JP)

(72) Inventors: Hiroyuki Kawato, Tokyo (JP); Shinichi Kasahara, Tokyo (JP); Masahiro Ide, Tokyo (JP); Osamu Torigoe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 178 days.

(21) Appl. No.: 15/121,794

(22) PCT Filed: Apr. 2, 2014

(86) PCT No.: PCT/JP2014/059710
§ 371 (c)(1),
(2) Date: Aug. 26, 2016

(87) PCT Pub. No.: WO2015/151239
PCT Pub. Date: Oct. 8, 2015

(65) Prior Publication Data
US 2017/0017540 A1    Jan. 19, 2017

(51) Int. Cl.
*G06F 11/00* (2006.01)
*G06F 11/07* (2006.01)
(Continued)

(52) U.S. Cl.
CPC .......... *G06F 11/0793* (2013.01); *G06F 11/07* (2013.01); *G06F 11/079* (2013.01);
(Continued)

(58) Field of Classification Search
CPC .. G06F 11/0793; G06F 11/07; G06F 11/0727; G06F 11/0751; G06F 11/079; G06F 11/36; G06F 13/4068
See application file for complete search history.

(56) References Cited

U.S. PATENT DOCUMENTS 5,148,432 A  *  9/1992  Gordon ................ G06F 3/0601
714/6.32
5,335,352 A  *  8/1994  Yanai ................... G06F 13/122
710/51

(Continued)

FOREIGN PATENT DOCUMENTS

JP    2007-249729 A    9/2007
JP    2009-294758 A    12/2009
WO    2009/147716 A1   12/2009

*Primary Examiner* — Bryce P Bonzo
*Assistant Examiner* — Jonathan D Gibson
(74) *Attorney, Agent, or Firm* — Volpe and Koenig, P.C.

(57) ABSTRACT

The present invention makes it possible to process a plurality of commands included in a series of communication processes in a shared manner by a plurality of circuit parts, thereby improving reliability and processing performance. A semiconductor integrated circuit for communication (212) includes: a plurality of first circuit parts (2121) that are responsible for communicating with a higher-level apparatus (4); a plurality of second circuit parts (2122), which analyze a command included in a series of communication processes, and which share the processing of a plurality of commands included in the series of processes with another second circuit part; a common connector (2123) for connecting the first circuit parts to the second circuit parts; and a failure management part (2124), which, when a failure has occurred in any circuit part, causes the stoppage of processing by a stop-target circuit part that must stop processing.

15 Claims, 12 Drawing Sheets

(51) Int. Cl.
*G06F 13/36* (2006.01)
*G06F 13/40* (2006.01)

(52) U.S. Cl.
CPC ...... *G06F 11/0727* (2013.01); *G06F 11/0751* (2013.01); *G06F 13/36* (2013.01); *G06F 13/4068* (2013.01)

(56) References Cited

U.S. PATENT DOCUMENTS

| | | | | |
|---|---|---|---|---|
| 5,771,367 | A * | 6/1998 | Beardsley | G06F 11/1435 711/113 |
| 5,819,054 | A * | 10/1998 | Ninomiya | G06F 3/0601 712/3 |
| 6,012,119 | A * | 1/2000 | Ninomiya | G06F 3/0601 710/305 |
| 7,234,023 | B2 * | 6/2007 | Abe | G06F 3/0614 711/112 |
| 7,783,922 | B2 * | 8/2010 | Kawamura | G06F 11/1076 714/20 |
| 7,836,204 | B2 * | 11/2010 | Kalos | G06F 11/2007 709/239 |
| 7,913,112 | B2 * | 3/2011 | Yuhara | G06F 11/0757 714/4.21 |
| 7,966,471 | B2 * | 6/2011 | Katsuragi | G06F 3/0613 711/111 |
| 8,234,542 | B2 * | 7/2012 | Katsuragi | G06F 11/0751 714/764 |
| 8,549,349 | B2 * | 10/2013 | Yuhara | G06F 11/0757 714/5.1 |
| 9,823,955 | B2 * | 11/2017 | Satoyama | G06F 11/0772 |
| 2001/0054136 | A1 * | 12/2001 | Ninomiya | G06F 3/0601 712/1 |
| 2003/0110330 | A1 * | 6/2003 | Fujie | G06F 1/184 710/36 |
| 2003/0135577 | A1 * | 7/2003 | Weber | G06F 3/0617 709/214 |
| 2004/0024950 | A1 * | 2/2004 | Surugucchi | H04L 67/1097 710/316 |
| 2006/0031389 | A1 * | 2/2006 | Shimozono | G06F 3/0605 709/217 |
| 2006/0277310 | A1 * | 12/2006 | Kalos | G06F 11/2007 709/228 |
| 2007/0220514 | A1 | 9/2007 | Sugimoto et al. | |
| 2007/0271481 | A1 * | 11/2007 | Kawakami | G06F 11/0727 714/5.11 |
| 2008/0201616 | A1 * | 8/2008 | Ashmore | G06F 11/0727 714/57 |
| 2009/0106583 | A1 * | 4/2009 | Kawamura | G06F 11/1076 714/6.13 |
| 2009/0234986 | A1 * | 9/2009 | Yuhara | G06F 11/0757 710/36 |
| 2011/0173494 | A1 | 7/2011 | Fukumura | |
| 2011/0289273 | A1 * | 11/2011 | Ikeuchi | G06F 3/0613 711/114 |
| 2013/0318391 | A1 * | 11/2013 | Kazemi | G06F 11/2094 714/6.11 |

* cited by examiner

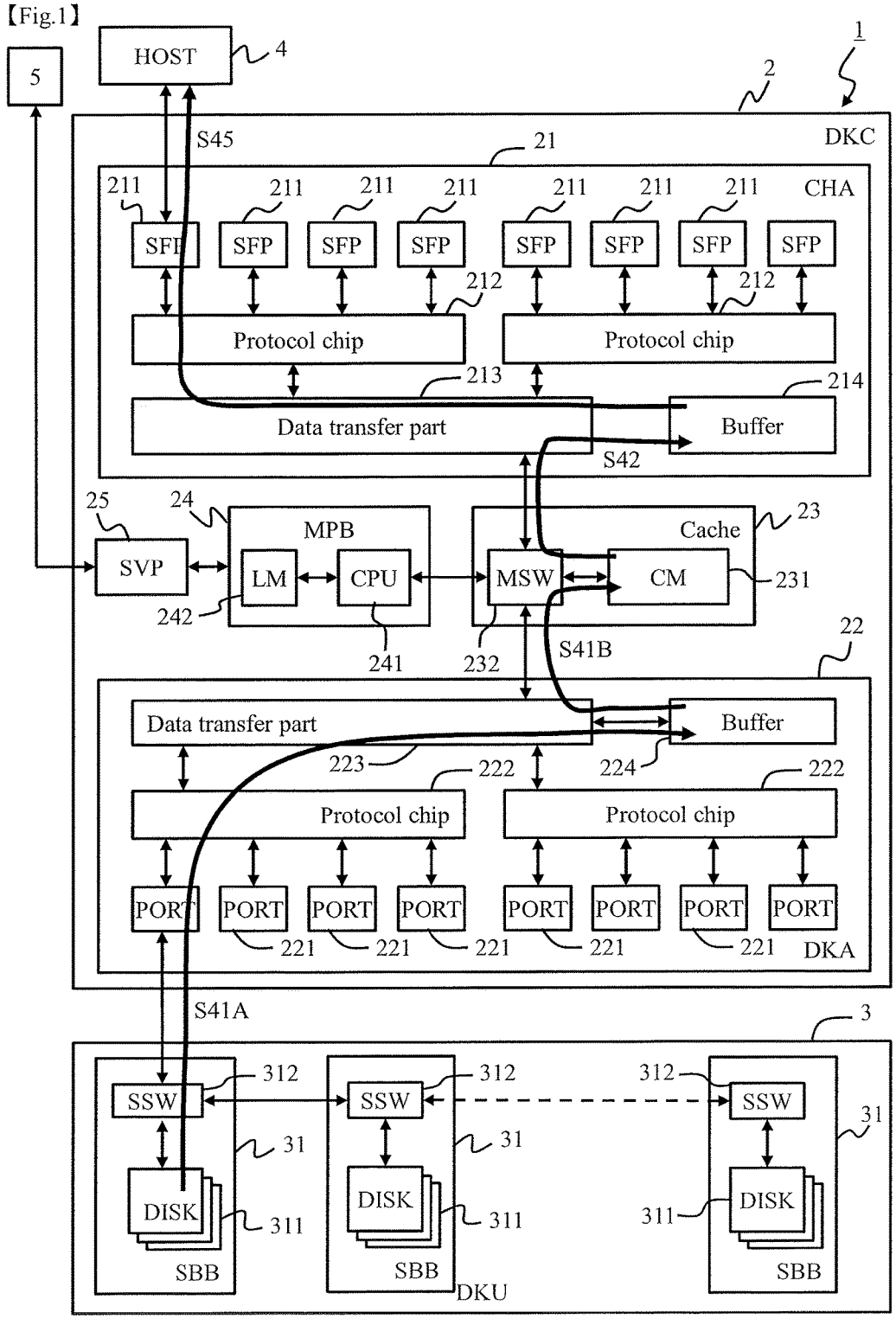

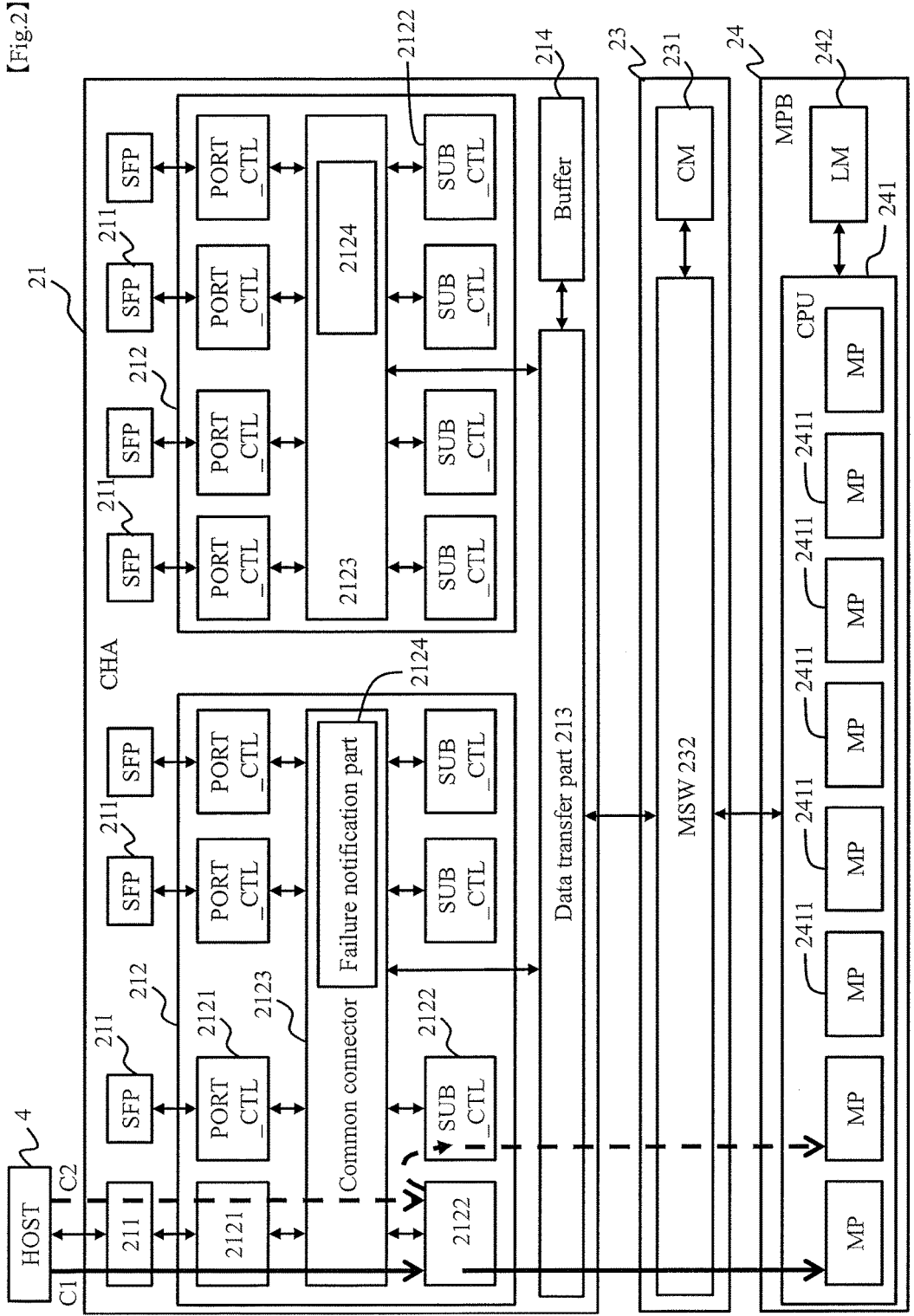

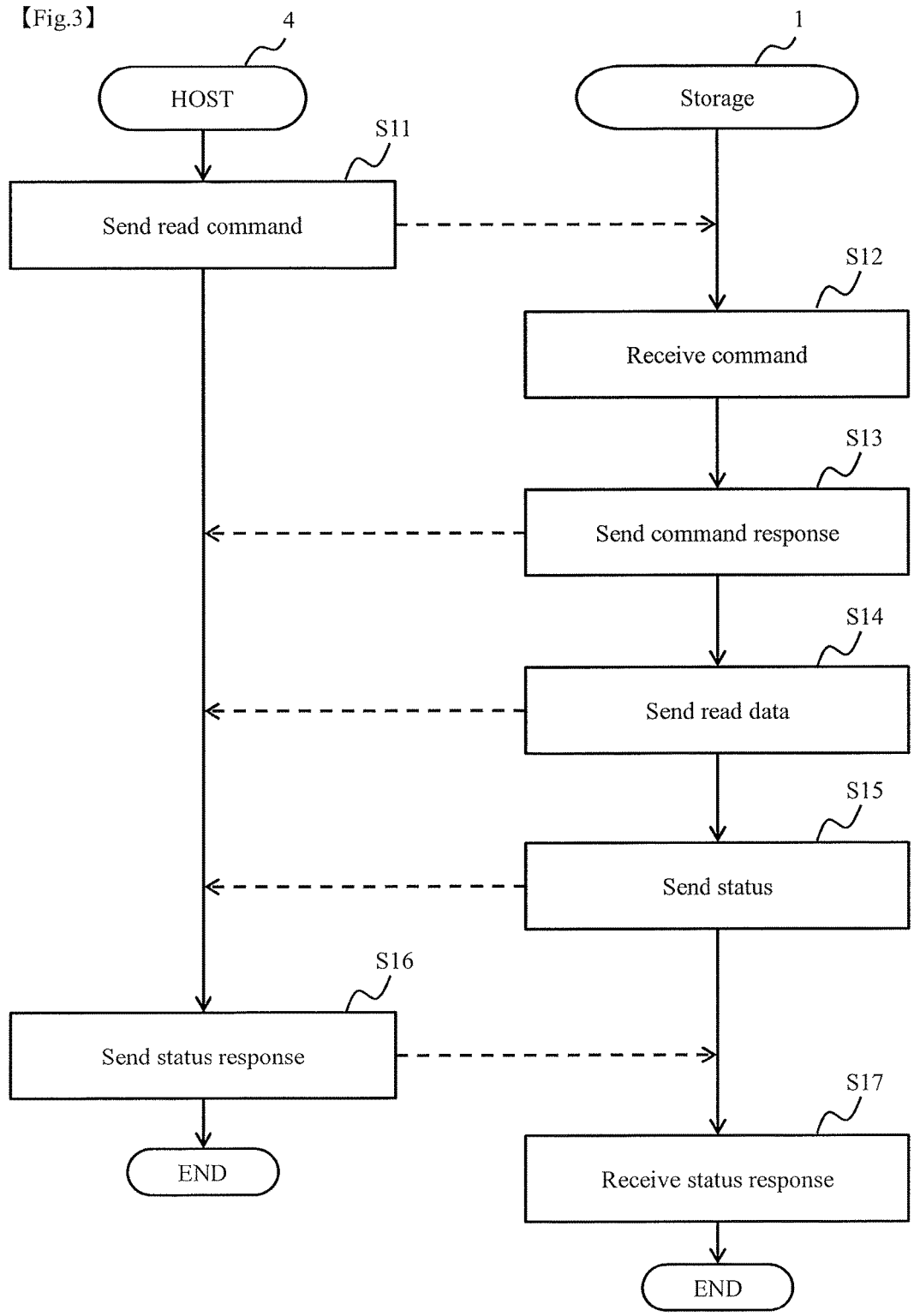

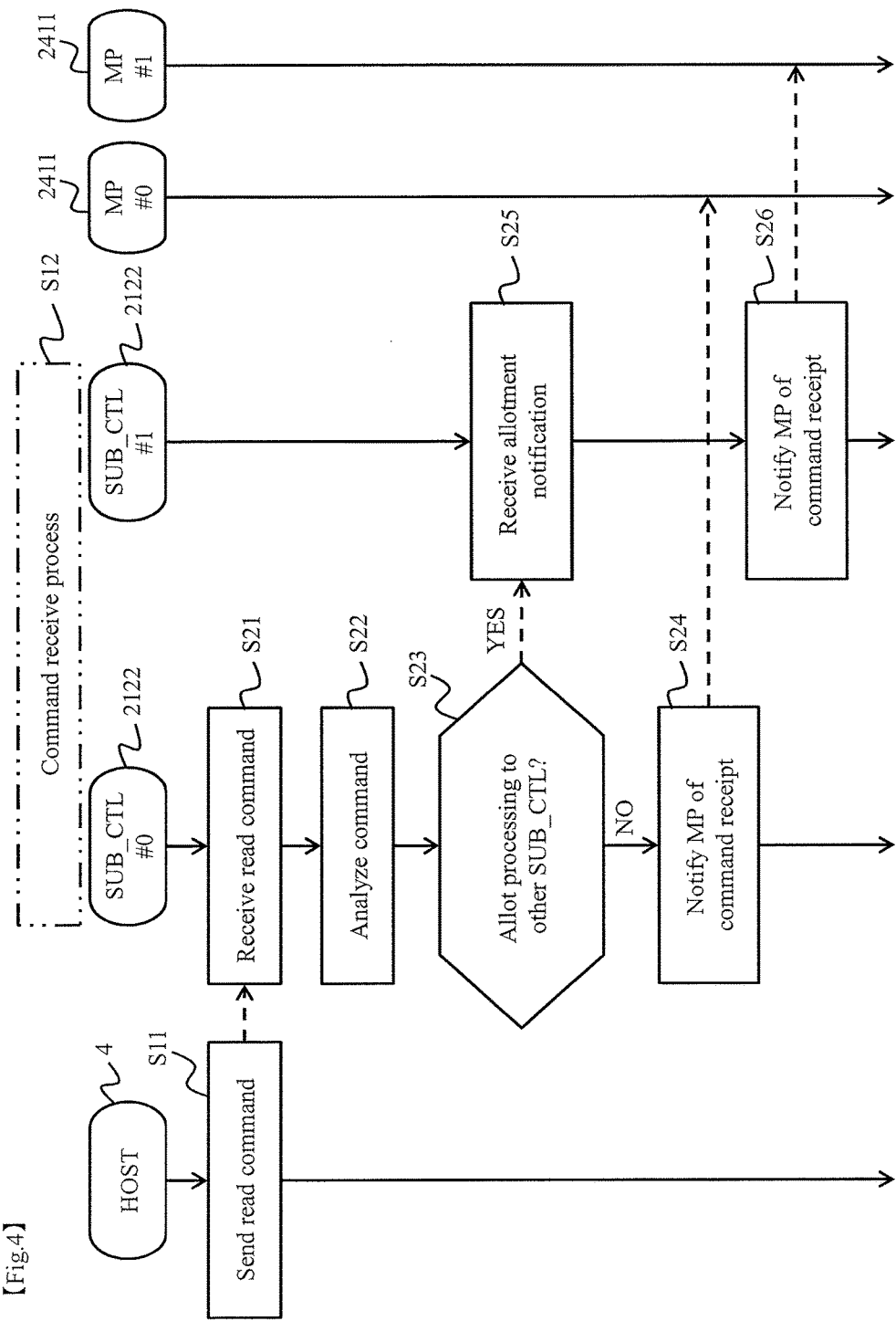

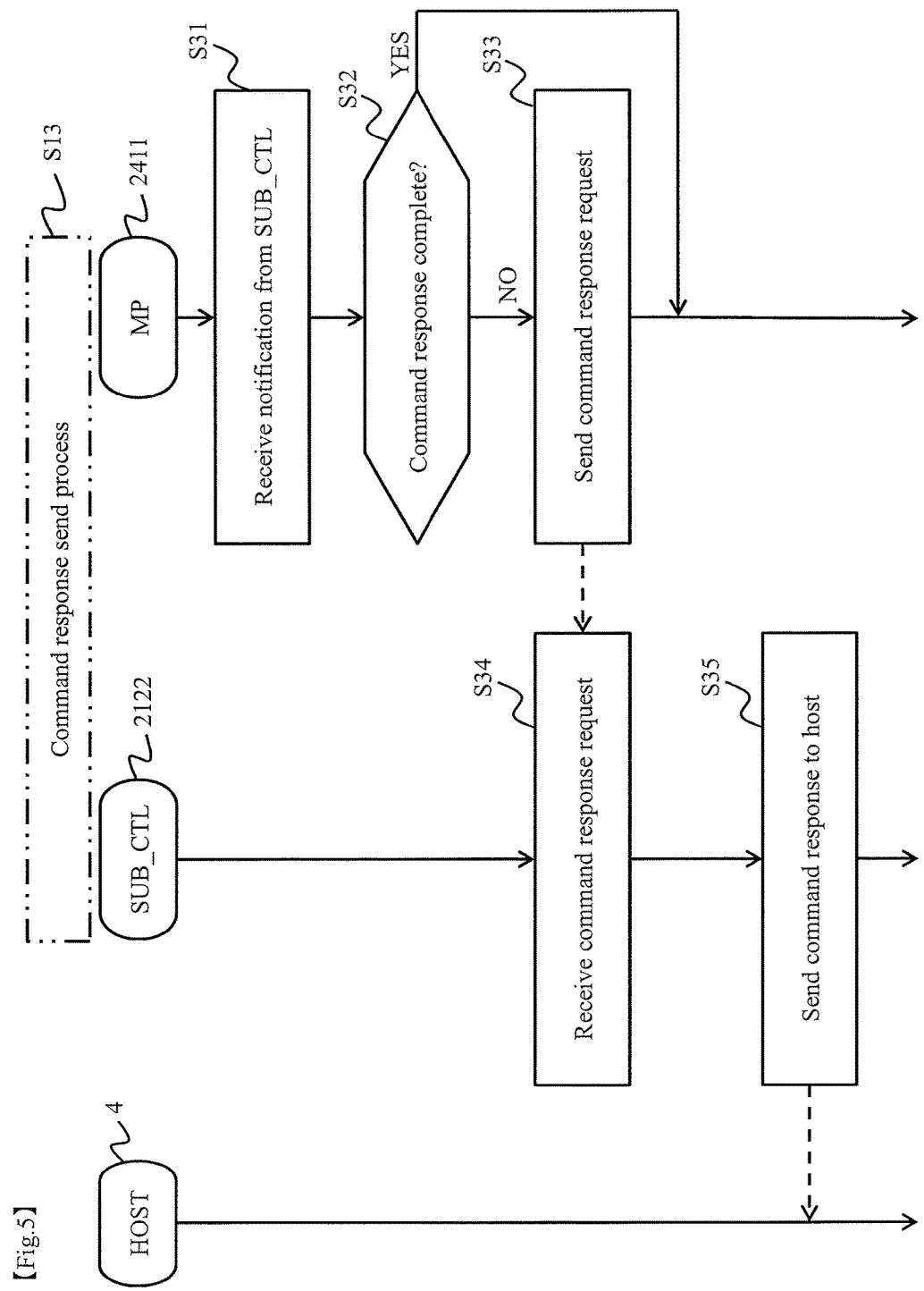

[Fig.6]
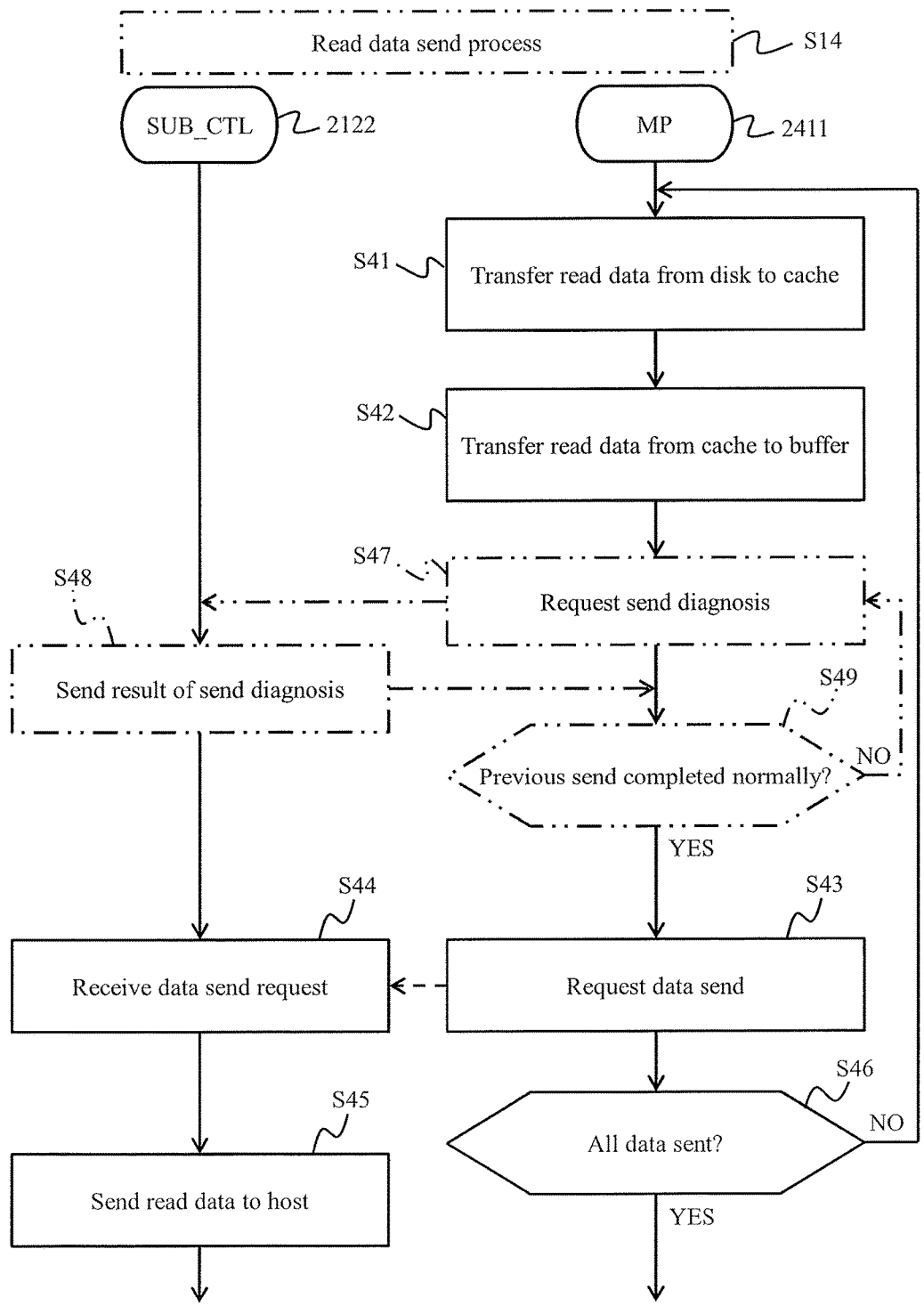

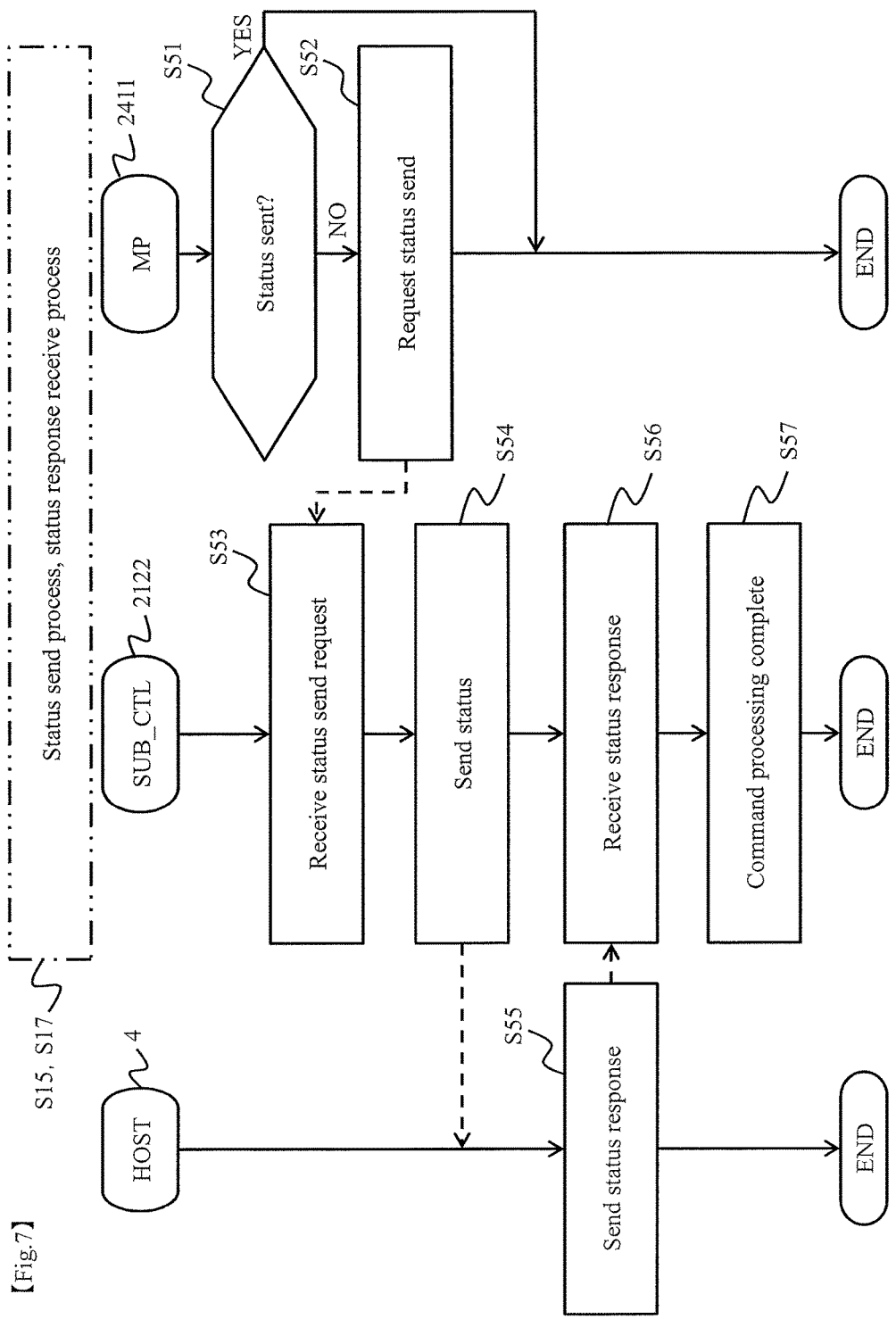

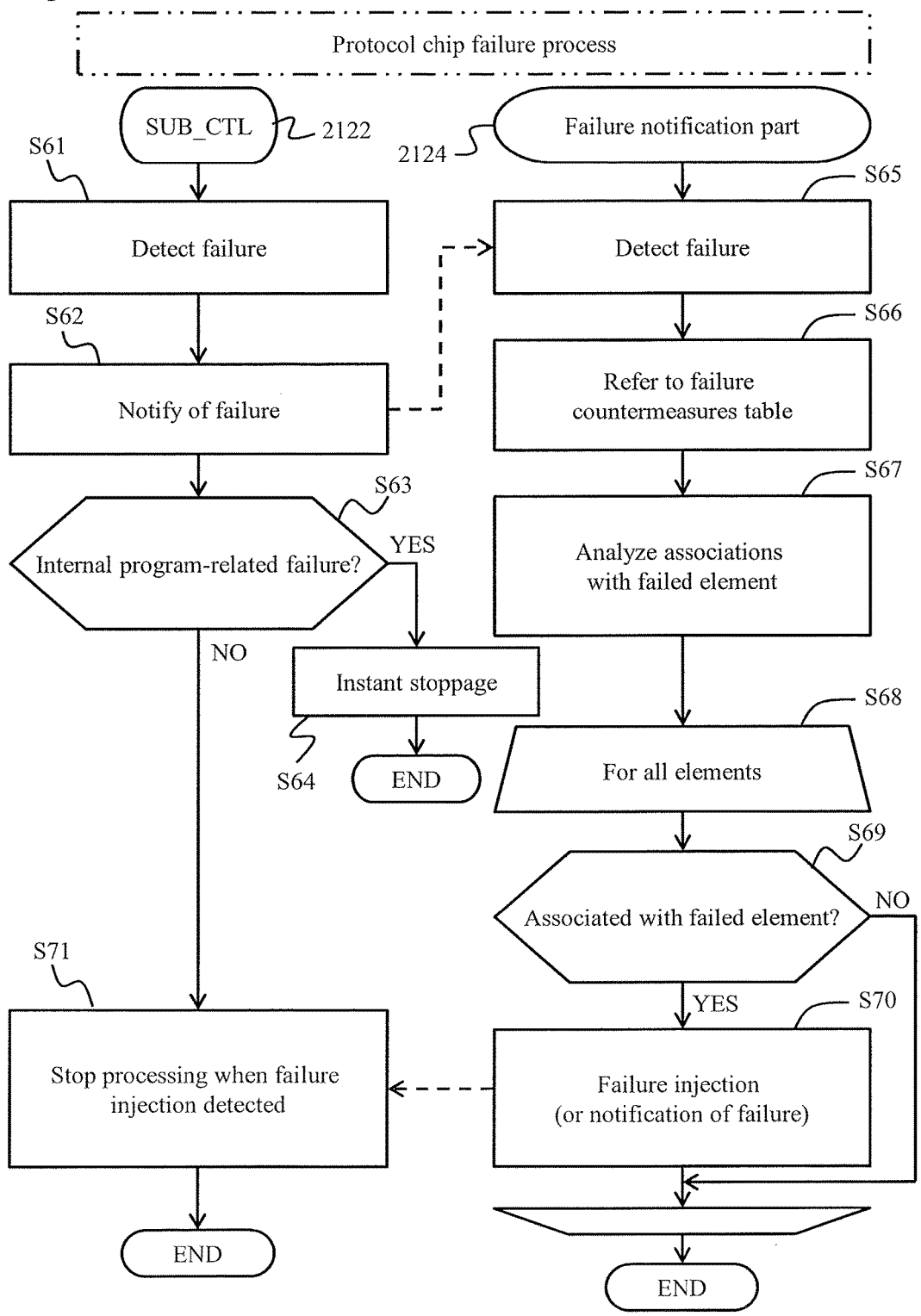

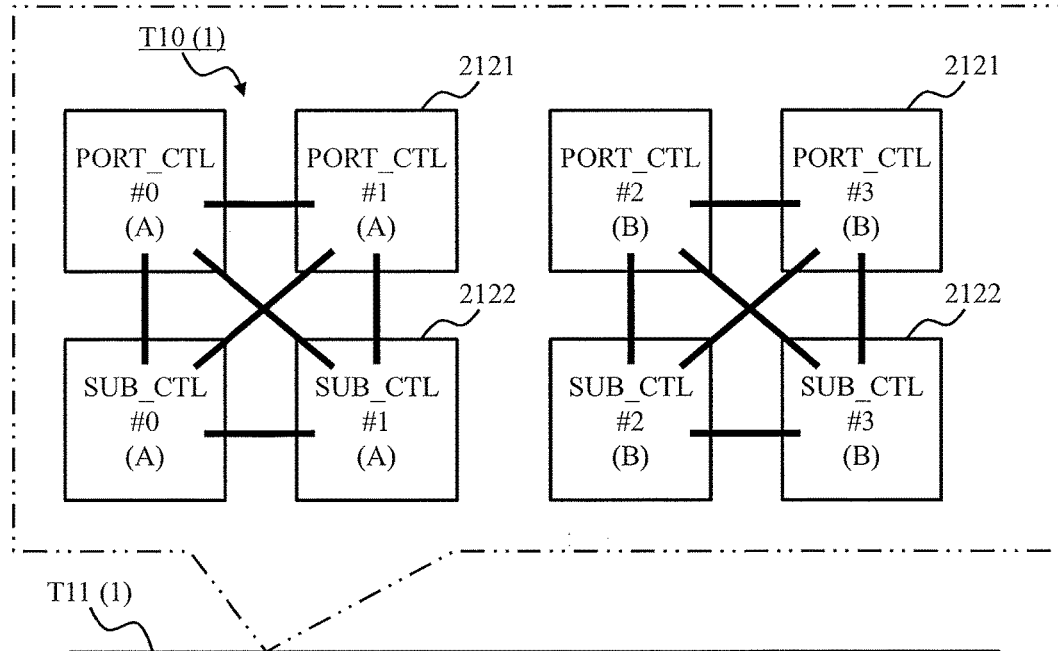
[Fig.9]

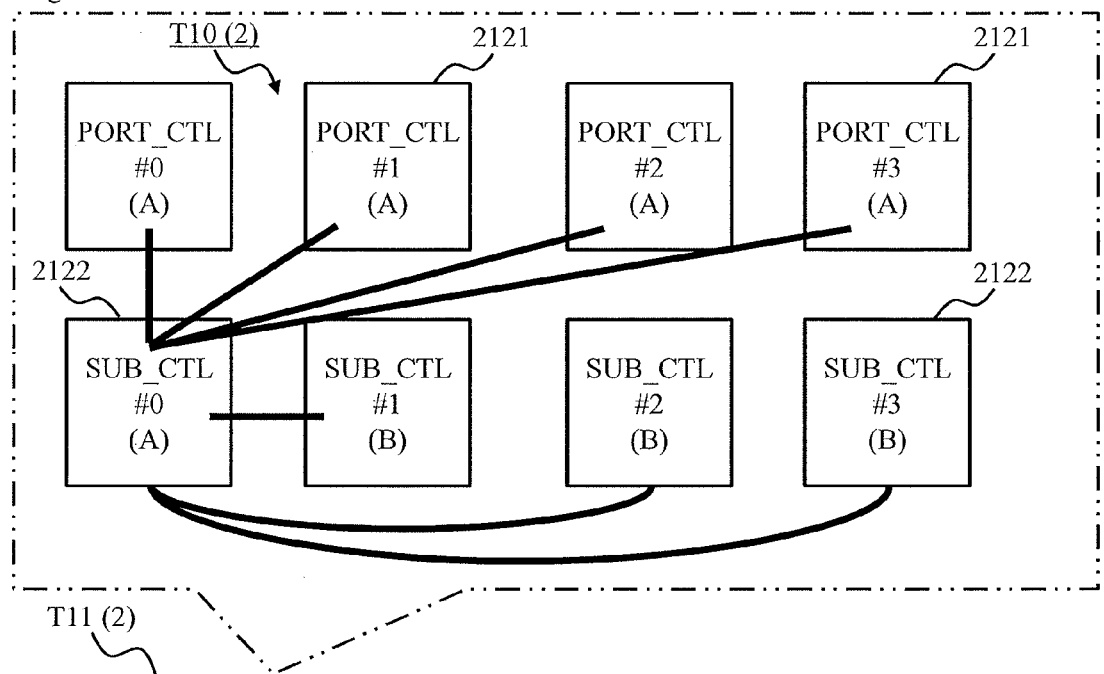
[Fig.10]

[Fig.11]
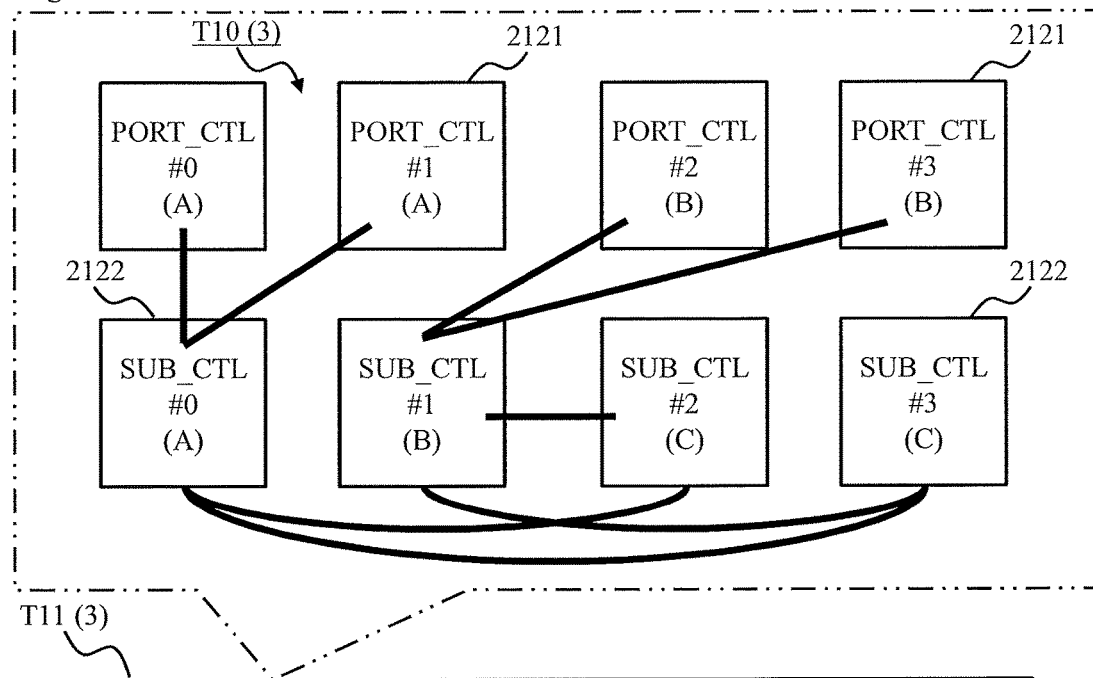

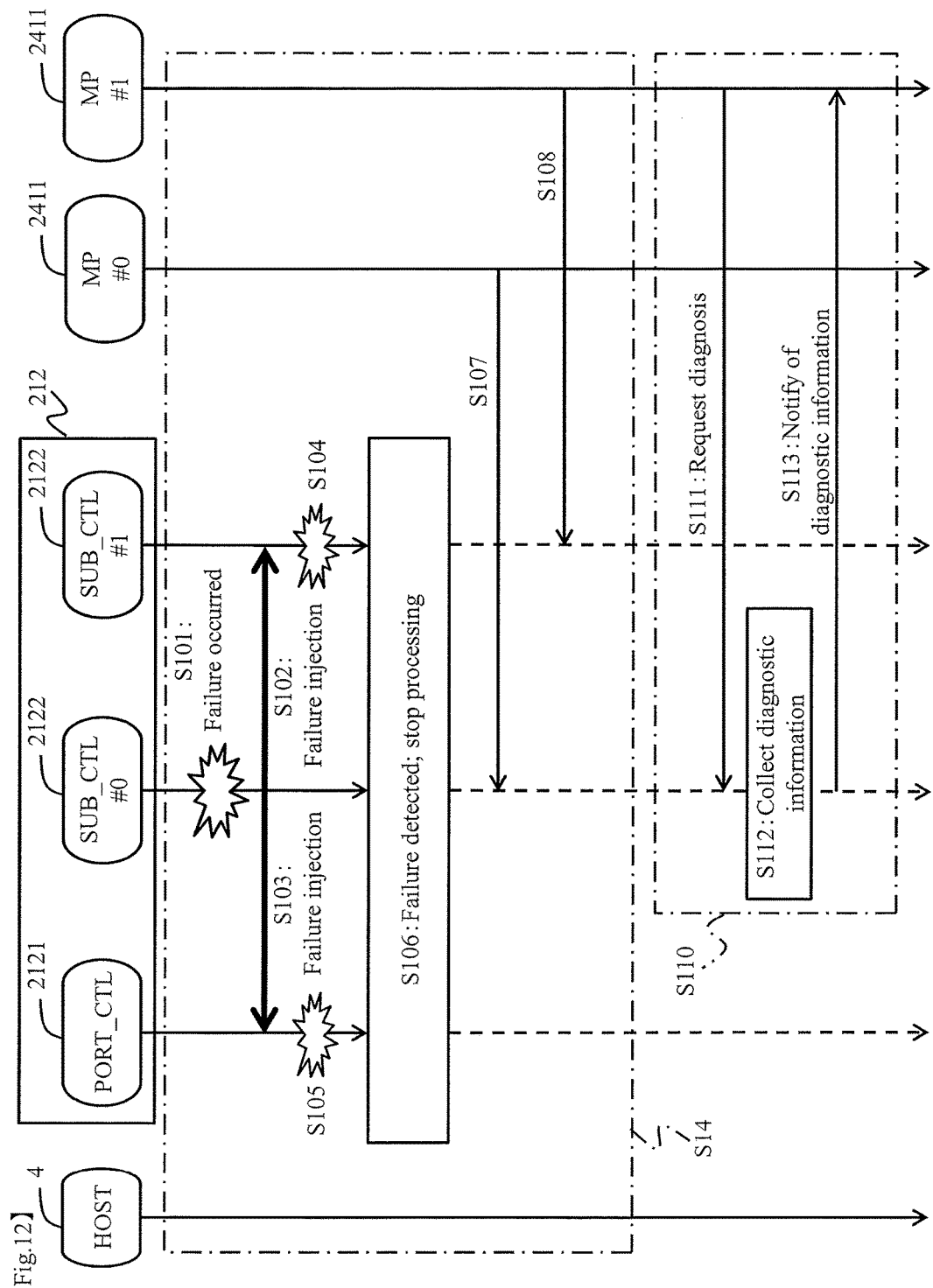

SEMICONDUCTOR INTEGRATED CIRCUIT FOR COMMUNICATION, STORAGE APPARATUS, AND METHOD FOR MANAGING FAILURE IN STORAGE APPARATUS

TECHNICAL FIELD

The present invention relates to a semiconductor integrated circuit for communication, a storage apparatus, and a method for managing a failure in the storage apparatus.

BACKGROUND ART

As disclosed in Patent Literature 1, in a case where a plurality of logical paths are provided on a single physical path, technology that makes it possible to suppress the affects of a failure, which has occurred in relation to a certain logical path, from impacting the other logical paths that share the physical path is known.

CITATION LIST

Patent Literature

[PTL 1]
Japanese Patent Application Publication No. 2009-294758

SUMMARY OF INVENTION

Technical Problem

Under normal circumstances, when a failure has occurred in any of an associated plurality of components (for example, the logical path of Patent Literature 1), control is performed so as not to impact the normal operation of the other components, and steps are taken so as to utilize the other components as much as possible.

However, when a failure has occurred in any of a plurality of circuits in a case where a series of communication processes with a higher-level apparatus is performed by sharing the processing among the plurality of circuits, send sequences are changed, data omissions occur, and the content of the communications sent to the higher-level apparatus becomes inaccurate. When the other normal circuits among the plurality of circuits that share the processing of a series of communications are operated as-is, erroneous communications continue and reliability deteriorates.

With the aforementioned problems in mind, an object of the present invention is to provide a semiconductor integrated circuit for communication, a storage apparatus, and a method for managing a failure in the storage apparatus that enable the processing of a plurality of commands included in a series of communication processes carried out with a higher-level apparatus to be performed normally and rapidly by sharing these commands among a plurality of circuit parts, thereby making it possible to improve reliability and processing performance.

Solution to Problem

To solve for the aforementioned problems, a semiconductor integrated circuit for communication according to the present invention is for communicating with a higher-level apparatus, and includes: a plurality of first circuit parts responsible for communication with the higher-level apparatus; a plurality of second circuit parts, which control a connected first circuit part of the plurality of first circuit parts and analyze a command included in a series of communication processes carried out with the higher-level apparatus, and which share processing of a plurality of commands of the series of processes with another second circuit part; a common connector for connecting the plurality of first circuit parts to the plurality of second circuit parts on the basis of a predetermined connection relationship; and a failure management part, which, when a failure has occurred in either the plurality of first circuit parts or the plurality of second circuit parts, detects from among the plurality of first circuit parts and the plurality of second circuit parts an associated circuit part that is associated with the failed circuit part, that is, a stop-target associated circuit part that must stop processing, and which causes the stoppage of processing by the detected stop-target associated circuit part.

Advantageous Effects of Invention

According to the present invention, the plurality of second circuit parts, which share the processing of a plurality of commands that are included in a series of communication processes, are able to operate until a failure occurs in its own circuit, or a failure has been injected from the failure management part, and there is no need for the second circuit parts to carry out processing while mutually checking the processing statuses thereof. Therefore, according to the present invention, processing performance is improved. Furthermore, according to the present invention, when a failure has occurred in a certain circuit part, since processing is stopped by injecting a failure into an associated circuit part targeted for stoppage, inconsistencies in the content of a communication with the higher-level apparatus can be suppressed, thereby improving reliability.

BRIEF DESCRIPTION OF DRAWINGS

FIG. 1 is a block diagram illustrating the overall configuration of a storage apparatus that uses a semiconductor integrated circuit for communication.

FIG. 2 is a block diagram illustrating an example of the configuration of a communication control part (CHM) that is responsible for communications with a host.

FIG. 3 is a flowchart for processing a read command from the host.

FIG. 4 is a flowchart showing in detail the process in FIG. 3 for receiving a command.

FIG. 5 is a flowchart showing in detail the process in FIG. 3 for sending a command response.

FIG. 6 is a flowchart showing in detail the process in FIG. 3 for sending read data.

FIG. 7 is a flowchart showing in detail the process for sending a status and the process for receiving a status response in FIG. 3.

FIG. 8 is a flowchart showing in detail the processing in a case where a failure has occurred in a protocol chip.

FIG. 9 shows a first example of a failure countermeasures table for managing a failure injection destination and so forth.

FIG. 10 shows a second example of a failure countermeasures table.

FIG. 11 shows a third example of a failure countermeasures table.

FIG. 12 is a flowchart showing operation when a failure has occurred.

DESCRIPTION OF EMBODIMENTS

An embodiment of the present invention will be described below on the basis of the drawings. As will be described hereinbelow, the present invention uses a protocol chip 212, which serves as a "semiconductor integrated circuit for communication", in a channel adapter (CHA in the drawings) 21, which serves as a "first communication controller" of the storage apparatus 1, for example.

As will be described respectively below, the protocol chip 212 includes a plurality of port controllers 2121 as "first circuit parts", a sub-controller 2122 as a "second circuit part", a common connector 2123, and a failure notification part 2124 as a "failure management part". A plurality of sub-controllers 2122 cooperate and are able to parallel process a plurality of commands that are included in a single I/O request. In the drawings, a port controller is denoted as PORT_CTL, and a sub-controller is denoted as SUB_CTL. In addition, the sub-controller 2122 is denoted as "core" in a failure countermeasures table T11 for the sake of convenience.

The failure notification part 2124 can be provided inside the common connector 2123, for example. The failure notification part 2124 implements a prescribed failure countermeasure process when a failure has occurred in any of the port controllers 2121 and/or sub-controller 2122.

As will be described below, the failure countermeasure process comprises a stop process as a first countermeasure process, and a notification process as a second countermeasure process. In the stop process, of the circuits associated with a circuit (2121, 2122) in which a failure has occurred, a circuit that has to stop processing is stopped by injecting a failure. In the notification process, a notification to the effect that a failure has occurred is issued to an associated circuit.

EXAMPLE 1

FIG. 1 illustrates the overall configuration of an information processing system that includes a storage apparatus 1. The information processing system is provided with at least one storage apparatus 1, and at least one host computer 4 as the "higher-level apparatus". A system administrator or the like may provide the information processing system with a management terminal 5 for managing the storage apparatus 1. The configuration may be such that the host computer 4 manages the storage apparatus 1 instead of the management terminal 5.

The storage apparatus 1 is provided with a control unit (DKC hereinbelow) 2, and a data storage unit (DKU hereinbelow) 3 that is controlled by the disk controller 2. The configuration of the DKU 3 will be described first, and the configuration of the DKC 2 will be described next.

The DKU 3 has a plurality of disk-equipped boxes (SBB hereinbelow) 31. Each SBB 31 has a plurality of storage devices 311, and a switching circuit (SSW) 312 for controlling the switching of these storage devices 311. Various drives that are capable of reading and writing data, such as a hard disk device, a semiconductor memory device, an optical disk device, and a magneto-optical disk device can be used as the storage devices 311, for example.

When a hard disk device is used, for example, a fibre channel (FC) disk, a small computer system interface (SCSI) disk, a SATA disk, an AT attachment (ATA) disk, or a serial attached SCSI (SAS) disk can be used. A variety of drives, such as a flash memory, a magnetoresistive random access memory (MRAM), a phase-change memory, a resistive random access memory (ReRAM), or a ferroelectric random access memory (FeRAM), for example, may also be used. In addition, the configuration may also be such that different types of drives are intermixed.

A redundant arrays of inexpensive disks (RAID) group can be formed from physical storage areas of a plurality of storage devices 311. A logical volume (not shown in the drawings) can be created from a logical storage area in the RAID group as a logical storage device. The storage apparatus 1 provides a logical volume to the host computer 4. The host computer 4 reads/writes data from/to the logical volume.

The configuration of the DKC 2 will be described. The DKC 2, for example, is provided with a plurality of channel adapters 21, a plurality of disk adapters (DKA in the drawings) 22, a plurality of memory parts (cache in the drawings) 23, and a plurality of processors (MPB in the drawings) 24. The DKC 2 may further include a service processor (SVP in the drawings) 25. The management terminal 5 acquires information related to the storage apparatus 1 and changes the configuration of the storage apparatus 1 via the service processor 25.

The channel adapter 21 is a control package for controlling communications with the host computer 4, and, for example, has a plurality of connectors (SFP in the drawings) 211, a plurality of protocol chips 212, a data transfer part 213, and a buffer memory 214.

A fibre channel cable comprising either an optical fibre or metal cable is connected to the connector 211. The connector 211 is coupled to the host computer 4 via the fibre channel cable. A fibre channel switch can also be provided between the connector 211 and the host computer 4.

The protocol chip 212 is a semiconductor integrated circuit responsible for processing communications with the host computer 4. When the host computer 4 is a mainframe, the protocol chip 212 communicates with the host computer 4 in accordance with a communication protocol, such as Fibre Connection (FICON: registered trademark), Enterprise System Connection (ESCON: registered trademark), Advanced Connection Architecture (ACONARC: registered trademark), or Fibre Connection Architecture (FIBARC: registered trademark), for example. The protocol chip 212 will be described in detail below using FIG. 2.

The data transfer part 213 transfers data between the buffer memory and the cache memory 231 of the memory part 23. In addition, data in the buffer memory 214 is sent from the data transfer part 213 to the host computer 4 via the protocol chip 212 and the connector 211. The buffer memory 214 is a temporary storage area for relaying the transfer of data between the Protocol chip 212 and the cache memory 231.

The disk adapter 22 is a package for controlling communications between storage devices 311 inside the PKU 3, and, for example, has a plurality of connectors (PORT in the drawings) 221, a plurality of protocol chips 212, a data transfer part 222, and a buffer memory 224.

The connector 221 is coupled to the switch 312 of the SBB 31 via a cable. The protocol chip 212 is an integrated circuit in charge of processing communications with the storage device 311. The data transfer part 223 transfers data between the buffer memory 224 and the memory part 23. In addition, data in the buffer memory 224 is transferred from the data transfer part 223 to a prescribed storage device 311 via the protocol chip 212 and the connector 221. The buffer memory 224 is a temporary storage area for relaying the data transferred between the protocol chip 212 and the cache memory 231.

The memory part 23 is provided with a plurality of cache memories 231, and a switch (MSW in the drawings) 232, for example. The cache memory 231 is a temporary storage area for temporarily storing data that has been read from the storage device 311, and/or temporarily storing data received from the host computer 4. The switch 232 controls the connections between the channel adapter 21, the disk adapter 22, the processor 24, and the cache memory 231.

The processor 24 controls the operation of the PKC 2. The processor 24, for example, has at least one central processing unit (CPU) 241, and at least one local memory 242. The CPU 241, as illustrated in FIG. 2, has a plurality of microprocessors (MP in the drawings) 2411.

The CPU 241 processes a command received from the host computer 4 and sends the processing result thereof to the host computer 4 by executing a prescribed computer program stored in the local memory 242.

An example of the configuration of the protocol chip 212 will be described using FIG. 2. FIG. 2 is an enlarged view showing the relationship between the CHA 21, the memory part 23, and the processor 24.

The protocol chip 212 is provided with a plurality of port controllers 2121, a plurality of sub-controllers 2122, a common connector 2123 for connecting these port controllers 2121 and sub-controllers 2122, and a failure notification part 2124.

The port controller 2121 is connected to the connector 211, and is a logic element for sending and receiving a command and data to and from the host computer 4. The sub-controller 2122 is a logic element for analyzing a protocol. The sub-controller 2122 analyzes an I/O request, and tasks a prescribed microprocessor 2411 to process a command included in the I/O request.

In the present example, the channel adapter 21 here has two protocol chips 212, and each protocol chip 212 has four port controllers 2121 and four sub-controllers 2122. The CPU 241 of the processor 24 has eight microprocessors 2411. Therefore, in the present example, the total number of port controllers 2121, the total number of sub-controllers 2122, and the total number of microprocessors 2411 in the storage apparatus 1 coincide with one another. The sub-controller 2122 tasks any one of the plurality of microprocessors 2411 to process a command. In addition, any one or a plurality of the plurality of sub-controllers 2122 can be configured as a representative sub-controller 2122. The representative sub-controller 2122 can entrust command processing to another sub-controller 2122 and the microprocessor 2411 that supports the other sub-controller 2122.

The common connector 2123 connects the port controllers 2121 and the sub-controllers 2122 on the basis of a connection configuration table T10 (will be described below using FIGS. 9 and 10). For example, when the storage apparatus 1 is booted up, the common connector 2123 connects the port controllers 2121 to the sub-controllers 2122 in accordance with the connection configuration table T10.

The common connector 2123 can also change the connection configuration of the port controllers 2121 and the sub-controller 2122 when instructed to do so from the management terminal 5. In addition, the common connector 2123 can also change the connection configuration of the port controllers 2121 and the sub-controllers 2122 each time an I/O request is received. In the present example, the present invention will be described as being adapted to determine the connection configuration of the port controllers 2121 and the sub-controllers 2122 when the storage apparatus 1 boots up, and not change this configuration thereafter.

An I/O request (a read request, for example) issued from the host computer 4 includes a plurality of commands C1 and C2. The port controller 2121, which received the initial command C1 inside the I/O request, transfers this command to the connection-destination sub-controller 2122 (representative sub-controller). The sub-controller 2122 (representative sub-controller) that is to process the initial command C1 can request that another sub-controller 2122, which is under the management thereof, share the command processing. That is, the subsequent command C2 included in the same I/O request is transferred to the other sub-controller 2122. Thus, the plurality of commands C1 and C2 are each processed by a different sub-controller 2122 and microprocessor 2411.

FIG. 3 is a flowchart for processing a read command from the host computer 4. The host computer 4 issues a read request when reading data from the storage apparatus 1. This read request includes a plurality of read commands (S11).

The DKC 2 of the storage apparatus 1, upon receiving the read command (S12), sends the host computer 4 a response to the effect that the read command has been received (S13). The DKC 2 sends the host computer 4 the requested read data (S14). Next, the DKC 2 sends the host computer 4 a status to the effect that read command processing has ended (S15).

The host computer 4, upon receiving the status from the DKC 2 of the storage apparatus 1, sends the storage apparatus 1 a status response to the effect that the status has been received (S16). The DKC 2 upon receiving the status response from the host computer 4 (S17), ends the read processing. Each of the above-described steps will be described in detail below.

FIG. 4 is a flowchart showing in detail the process for receiving a command, which is shown as Step S12 in FIG. 3. It is supposed here that one sub-controller 2122 (#0) and another sub-controller 2122 (#1) form a group, and that the one sub-controller 2122 (#0) is associated with one microprocessor 2411 (#0), and the other sub-controller 2122 (#1) is associated with another microprocessor 2411 (#1). It is supposed that the one sub-controller 2122 is a representative sub-controller that represents the group.

The protocol chip 212 of the channel adapter 21 receives the read command that was sent from the host computer 4 (S11). The port controller 2121 of the protocol chip 212 sends the received read command to the sub-controller 2122 (#0).

The sub-controller 2122 (#0), upon receiving the read command (S21), analyzes this read command (S22). The sub-controller 2122 (#0) can allot the processing of the read command to the other sub-controller 2122 (#1) in the group in order to execute the Plurality of read commands in the read request in a shared manner inside the DKC 2 (S23).

As used here, the allotment of the command processing to the other sub-controller 2122 signifies that the processing of this command is entrusted to the other sub-controller 2122. The allotment of command processing may also be expressed as the allocation of command processing, or the shared processing of a command.

In a case where the sub-controller 2122 (#0) does not allot the processing of the command received in Step S21 to the other sub-controller 2122 (#1) (S23: NO), the sub-controller 2122 (#0) notifies the associated microprocessor 2411 (#0) to the effect that a read command has been received (S24).

Alternatively, the sub-controller 2122 (#0) can allot the processing of the read command received in Step S21 to the other sub-controller 2122 (#1) (S23: YES). The sub-controller 2122 (#1), upon receiving a notification from the sub-controller 2122 (#0) indicating the allotment of read command processing (S25), notifies the associated microprocessor 2411 (#1) to the effect that a read command has been received (S26).

FIG. 5 is a flowchart showing in detail the process for sending a command response, which is shown as Step S13 in FIG. 3.

The microprocessor 2411, upon receiving a notification from the sub-controller 2122 to the effect that a read command has been received as shown in either Step S25 or S26 of FIG. 4 (S31), determines whether a response has been issued for this read command (S32). When a response has not been issued (S32: NO), the microprocessor 2411 issues a request to the sub-controller 2122 to send a command response to the host computer 4 (S33). When a command response has already been sent to the host computer 4 from the other sub-controller 2122 (S32: YES), the microprocessor 2411 ends command response-related processing.

Upon receiving a request from the associated microprocessor 2411 to send a command response (S34), the sub-controller 2122 sends a command response to the host computer 4 (S35). The host computer 4 learns that the read command has been received upon receiving the command response from the storage apparatus 1 DKC 2.

FIG. 6 is a flowchart showing in detail the process for sending read data, which is shown as Step S14 in FIG. 3.

The microprocessor 2411, which has received a read command, executes a staging process for the requested data (read data) (S41). The staging process is a process that transfers the read data from the storage device 311 to the cache memory 231. The storage device 311 is denoted as disk in the drawing.

As shown in FIG. 1, the microprocessor 2411 reads the read data from the storage device 311 where the read data is stored, and transfers the read data to the buffer memory 224 of the disk adapter 22 (S41A). Next, the microprocessor 2411 transfers the read data inside the buffer memory 224 of the disk adapter 22 to the cache memory 231 of the memory part 23 (S41B). The read data is thus stored in the cache memory 231, and the staging process ends.

Return to FIG. 6. The microprocessor 2411 transfers the read data in the cache memory 231 to the buffer memory 214 of the channel adapter 21 (S42). Steps S47 to S49 shown by the two-dot chain lines will be described below.

The microprocessor 2411 issues a request to the sub-controller 2122 to send the read data to the host computer 4 (S43). The sub-controller 2122, upon receiving the request from the microprocessor 2411 to send the data (S44), sends the read data stored in the buffer memory 214 to the host computer 4 from the connector 211 (S45).

The microprocessor 2411 determines whether all of the read data requested by the read command has been sent to the host computer 4 (S46). When there is unsent read data (S46: NO), the microprocessor 2411 returns to Step S41. When all the read data that was requested by the read command has been sent (S46: YES), the microprocessor 2411 ends the processing for sending the read data.

Steps S47 to S49, which are shown by the two-dot chain lines in FIG. 6, will be described. These Steps S47 to S49 show processing that is believed may be needed when the present invention is not applied.

When processing a plurality of read commands included in a read request in a shared manner with a plurality of sub-controllers 2122, each sub-controller 2122 must carry out processing while confirming the operation of the other sub-controller 2122 that is processing the read commands in a shared manner. In a case where a failure has occurred and the functioning of the one sub-controller 2122 has been stopped, and the other sub-controller 2122 carries out the processing of the read command without knowing anything about this, the sequence of the data sent to the host computer 4 from the storage apparatus 1 cannot be guaranteed. In this case, the host computer 4 receives the data in the incorrect order and the reliability of the storage apparatus 1 deteriorates.

Therefore, when the plurality of sub-controllers 2122 share command processing, generally speaking, each sub-controller 2122 must carry out the processing while confirming the status of the other. Accordingly, Steps S47 to S49 are shown in FIG. 6 as examples of a configuration for carrying out processing while mutually confirming statuses. These Steps S47 to S49 are a comparative example for describing the advantages of the present invention, and are not disclosed as prior art.

In the comparative example, before sending the read data that it itself is responsible for, the microprocessor 2411 checks to make sure that the previous read data was has been sent normally. Accordingly, the microprocessor 2411 issues a request to the sub-controller 2122 for a send diagnosis (S47). The sub-controller 2122 checks whether the previous read data was sent normally, and returns the result to the microprocessor 2411 (S48).

Upon confirming that the previous read data was sent normally (S49: YES), the microprocessor 2411 issues a request to the sub-controller 2122 to send the read data, which has been transferred from the storage device 311 to the buffer memory 214 in the channel adapter 21, to the host computer 4.

When a plurality of sub-controllers 2122, which are sharing read command processing, carry out the processing while mutually confirming statuses like this, the processing performance of the storage apparatus 1 deteriorates due to the communication overhead time generated for communication.

By contrast, in the present example, in a case where a plurality of sub-controllers 2122 share read command processing, each sub-controller 2122 executes command processing without confirming the status of the other sub-controller 2122. In the present example, since there is no need for Steps S47 to S49 as shown in FIG. 6, communication overhead time is not generated. Therefore, the processing performance of the storage apparatus 1 can be improved.

In addition, in the present example, in a case where a failure occurs in any of the sub-controllers 2122 that are sharing the read command processing, the failure notification part 2124 causes a stoppage by injecting a failure into the other sub-controller 2122 associated with the sub-controller 2122 that is the source of the failure.

Therefore, since all of the sub-controllers 2122 that are sharing the read command processing stop processing, it is possible to prevent erroneous processing results from being sent to the host computer 4, thereby improving the reliability of the storage apparatus 1.

Thus, in the present example, because of a configuration that causes the stoppage of all of the sub-controllers 2122 that should be stopped when a failure occurs, each sub-controller 2122 is able to execute command processing until stopped by the injection of a failure from the failure notification part, doing away with the need for confirming the statuses among the sub-controllers.

FIG. 7 is a flowchart showing in detail the process for sending the status, which is shown as Step S15, and the process for receiving the status response, which is shown as Step S17 of FIG. 3.

After processing the read command and sending all the read data to the host computer 4, the microprocessor 2411 determines whether a status showing the command processing results has been sent to the host computer 4 (S51). When the status has not been sent (S51: NO), the microprocessor 2411 issues a request to the sub-controller 2122 to send the status to the host computer 4 (S52).

The sub-controller 2122, upon receiving the send status request from the microprocessor 2411 (S53), sends the status to the host computer 4 (S54). However, Step S54 is skipped when the other sub-controller 2122 has sent the status to the host computer 4 earlier.

Upon receiving the status from the sub-controller 2122, the host computer 4 sends the sub-controller 2122 a status response indicating receipt of the status (S55). The sub-controller 2122, upon receiving the status response from the host computer 4 (S56), completes the read command processing (S57).

FIG. 8 is a flowchart showing an example of a failure process for processing a failure that occurs in the protocol chip 212 inside the protocol chip 212.

In the present example, a failure that occurs in the protocol chip 212 can be broadly classified as a failure based on an internal factor of the port controller 2121 and/or sub-controller 2122 that serve as logic elements, or a failure (an external factor-based failure) injected into the sub-controller 2122 from the failure notification part 2124. In addition, an internal factor-based failure can be divided into an internal program-related failure, and a failure related to a configuration other than an internal program. In the present example, as described below, different countermeasures are executed in accordance with the type of failure.

A description is provided by giving as an example in FIG. 8 a sub-controller 2122 as the logic element in which a failure occurs, but the same holds true for a port controller 2121.

The sub-controller 2122 monitors for whether a failure has occurred, and upon detecting the occurrence of a failure (S61), notifies the failure notification part 2124 to the effect that a failure has occurred (S62).

The sub-controller 2122 determines whether the detected failure is related to an internal program (S63). When the failure is related to the processing of an internal program (S63: YES), the sub-controller 2122 shuts down immediately to facilitate program analysis (S64). A failure other than a failure related to the processing of an internal program may include a failure of a hardware circuit inside the sub-controller 2122, for example. When the sub-controller 2122 has determined that the failure is not related to internal program processing (S63: NO), there is no need to stop processing right away.

The failure notification part 2124 detects the fact that a failure has occurred in accordance with the failure notification from the sub-controller 2122 (S65). The failure notification part 2124 refers to the failure countermeasures table T11 (will be described below using FIG. 9), and analyzes the logic element where the failure occurred (the sub-controller 2122 here) and associated logical elements (a sub-controller and/or a port controller) (S67).

The failure notification part 2124 determines whether or not all of the logic elements in the protocol chip 212 (S68) are associated with the logic element in which the failure occurred (S69), and injects a failure into the logical element(s) associated with the failed logic element (S70).

Depending on the connection configuration of the logic elements, the failure notification part 2124 need not inject a failure into all of the associated logic elements. The failure notification part 2124 only injects a failure into the logic element that should be stopped, and may simply notify the logic element, which does not need to be stopped even though the logic element is associated with the failed logic element, about the failure.

The sub-controller 2122, upon detecting the failure that was injected from the failure notification part 2124, stops processing (S71). The microprocessor 2411 detects the processing stoppage on the part of the sub-controller 2122 in accordance with a periodic diagnostic process described below. The periodic diagnostic process will be described below while referring to Step S110 of FIG. 12.

In FIG. 8, a failed sub-controller 2122 is given as an example, but a sub-controller 2122 that is operating normally executes Step S71 when notified of a failure from the failure notification part 2124 without executing Steps S61 to S64.

Instead of the processing shown in FIG. 8, the failure notification part 2124 may, on the basis of the contents configured in the failure countermeasures table T11, inject a failure into a logic element that should be stopped, and simply send a failure notification to a logic element that does not need to be stopped even though associated with the failed logic element. In this case, Steps S67 to S69 can be omitted, for example.

Examples of the connection configuration table T10 and the failure countermeasures table T11 will be described using FIGS. 9 to 11.

The connection configuration table T10 is management information in which the connection relationship between the port controllers 2121 and the sub-controllers 2122 has been configured. In a case where a failure has occurred in a certain logic element, the failure countermeasures table T11 is management information for applying a prescribed failure countermeasure to a logic element associated with the logic element that is the source of this failure. The connection configuration table T10 is used mainly by the common connector 2123, and the failure countermeasures table T11 is used by the failure notification part 2124. The connection configuration table T10 and the failure countermeasures table T11 can also be integrated. The relationship between a location where a failure has occurred and a location where a prescribe failure countermeasure is applied will be described for respective connection configurations giving three types of connection configurations as examples.

FIG. 9 shows a first connection configuration. As shown in the connection configuration table T10 (1), in the first connection configuration, a plurality of groups are formed using two sub-controller 2122 and two port controllers 2121, and each sub-controller 2122 controls the respective port controller 2121 inside each group.

In the example shown in the drawing, a first group A is formed from sub-controllers 2122 (#0) and 2122 (#1) and port controllers 2121 (#0) and 2121 (#1). The one sub-controller 2122 (#0) in the first group A controls both of the port controllers 2121 (#0) and 2121 (#1). In addition, the one sub-controller 2122 (#0) is connected to the other sub-controller 2122 (#1) in the same group in a manner that makes cooperation possible. The other sub-controller 2122 (#1) in the first group A is also able to control both of the port controllers 2121 (#0) and 2121 (#1), and is connected to the one sub-controller 2122 (#0) in a manner that makes cooperation possible. The port controllers 2121 (#0) and 2121 (#1) in the first group A are connected.

A second group B is formed from sub-controllers 2122 (#2) and 2122 (#3) and port controllers 2121 (#2) and 2121 (#3). The one sub-controller 2122 (#2) in the second group B controls both of the port controllers 2121 (#2) and 2121 (#3), and is connected to the other sub-controller 2122 (#3)

in a manner that makes cooperation possible. The other sub-controller 2122 (#3) in the first group B also controls both of the port controllers 2121 (#2) and 2121 (#3), and is connected to the one sub-controller 2122 (#2) in a manner that makes cooperation possible. The port controllers 2121 (#2) and 2121 (#3) in the second group B are connected.

The failure countermeasures table T11 (1) that is used when a failure has occurred in the first connection configuration defined in the connection configuration table T10 (1) will be described.

In the failure countermeasures table T11, a white circle indicates a logic element in which a failure has occurred. A black circle indicates a stop-target logic element from among the logic elements associated with the failed logic element, that is, a logic element that is to be injected with a failure by the failure notification part 2124. A white triangle indicates a notification-target logic element from among the logic elements associated with the failed logic element, that is, a logic element that is to be notified of the occurrence of a failure by the failure notification part 2124. A hyphen indicates a logic element that is unrelated to the failed logic element.

When a failure has occurred in the one sub-controller 2122 (#0) of the first group A, processing stops because a failure is injected into the other sub-controller 2122 (#1) forming the pair. In addition, a failure is also injected into each of the port controllers 2121 (#0) and 2121 (#1) controlled by the sub-controller 2122 (#0), which is the source of the failure, and processing stops.

When a failure has occurred in the other sub-controller 2122 (#1) of the first group A, a failure is injected into all associated logic elements, that is, the one sub-controller 2122 (#0) and each of the port controllers 2121 (#0) and 2121 (#1), and processing stops.

Failure countermeasures are also implemented for the second group B in the same manner as the first group A. When a failure has occurred in the sub-controller 2122 (#2), a failure is injected into the sub-controller 2122 (#3) and each of the port controllers 2121 (#2) and 2121 (#3), and processing stops. When a failure has occurred in the sub-controller 2122 (#3), a failure is injected into the sub-controller 2122 (#2) and each of the port controllers 2121 (#2) and 2121 (#3), and processing stops.

That is, in the case of the first connection configuration, when a failure has occurred in any of the sub-controllers 2122 in a group, a failure is injected into all the other logic elements in the same group. Thus, processing stops substantially simultaneously in the group as a whole. This is to maintain consistency in the command processing results, and to prevent erroneous processing results from being sent to the host computer 4.

Failure countermeasures when a failure has occurred in a port controller 2121 will be described. When a failure has occurred in the one port controller 2121 (#0) of the first group A, each of the sub-controllers 2122 (#0) and 2122 (#1) in the first group A is notified of the failure. No countermeasures are carried out for the other port controller 2121 (#1) in the first group A. The sub-controllers 2122 (#0) and 2122 (#1) are able to use the normal port controller 2121 (#1).

When a failure has occurred in the other port controller 2121 (#1) of the first group A, each of the sub-controllers 2122 (#0) and 2122 (#1) in the first group A is notified of the failure in the same manner as above. Since the same also holds true for the second groups B, a description will be omitted.

Thus, in a case where a failure has occurred in a port controller 2121, the sub-controllers 2122 that control the failure-source port controller 2121 are simply notified of the fact that a failure occurred, and are not injected with a failure. That is, the sub-controllers 2122 associated with the failure-source port controller 2121 are not forced to stop processing. The sub-controllers 2122 that control the port controller 2121 in which the failure occurred also control the other port controller 2121, which is operating normally. Therefore, the sub-controllers 2122, which should prevent the affects of the failure from impacting the normal port controller 2121, are simply notified of the failure and are not forced to stop processing.

FIG. 10 shows a second connection configuration. As shown in the connection configuration table T10 (2), in the second connection configuration, one sub-controller 2122 (#0) forms a first group A with all of the port controllers 2121 (#0) to 2121 (#3), and the remaining other sub-controllers 2122 (#1) to 2122 (#3) form a second group B.

The sub-controller 2122 (#0) of the first group A constitutes a representative sub-controller, and controls all of the port controllers 2121 (#0) to 2121 (#3). The representative sub-controller 2122 (#0) is connected to all the other sub-controllers 2122 (#1) to 2122 (#3) in a manner that enables cooperation. That is, in the second connection configuration, port control is collectively implemented by a single sub-controller 2122 (#0), and command processing is shared by the other sub-controllers 2122 (#1) to 2122 (#3).

A failure countermeasures table T11 (2) corresponding to the second connection configuration will be described. When a failure has occurred in the sub-controller 2122 (#0) that controls all of the port controllers 2121 (#0) to 2121 (#3), none of the port controllers 2121 (#0) to 2121 (#3) can be used. Therefore, in this case, the failure notification part 2124 respectively injects a failure into all of the port controllers 2121 (#0) to 2121 (#3) and all of the other sub-controllers 2122 (#1) to 2122 (#3) to cause the stoppage of processing.

By contrast, when a failure has occurred in any of the other sub-controllers 2122 (#1) to 2122 (#3) that do not perform port control, command processing simply needs to be resumed using a different sub-controller 2122 than the sub-controller 2122 in which the failure occurred. Therefore, a failure is not injected into the associated other sub-controllers 2122. The representative sub-controller 2122 (#0) is notified of a failure. Because the port controllers 2121 (#0) to 2121 (#3) are not directly related to the failed sub-controller 2122, no failure countermeasures are performed.

When a failure has occurred in any of the port controllers 2121 (#0) to 2121 (#3), the failure notification part 2124 only notifies the representative sub-controller 2122 (#0) of the failure, and does not cause a stoppage of processing by the other logic elements. The representative sub-controller 2122 (#0) can communicate with the host computer 4 using a different port controller 2121 than the failed port controller 2121.

FIG. 11 shows a third connection configuration. As shown in the connection configuration table T10 (3), in the third connection configuration, one sub-controller 2122 (#0) forms a first group A with two port controllers 2121 (#0) and 2121 (#1). One other sub-controller 2122 (#1) forms a second group B with the other two port controllers 2121 (#2) and 2121 (#3). The remaining sub-controllers 2122 (#2) and 2122 (#3) form a third group C.

In the first group A and the second group B, each of the sub-controllers 2122 controls two port controllers 2121, and the sub-controllers 2122 (#2) and 2122 (#3) of the third group C share the command processing. Specifically, using the first group A as an example, the sub-controller 2122 (#0) controls port controllers 2121 (#0) and 2121 (#1) in the same group, and cooperates with the sub-controllers 2122 (#2) and 2122 (#3) of the third group C. The relationship between the second group B and the third group C is the same as the relationship between the first group A and the third group C. In other words, the third connection configuration shows a case in which a plurality of the second connection configuration shown in FIG. 10 are provided in the protocol chip 212.

When a failure has occurred in the sub-controller 2122 responsible for port control in the respective groups, the failure notification part 2124 injects a failure into the control-target port controller 2121, thereby causing processing to stop. The failure notification part 2124 simply notifies the sub-controllers 2122 (#2) and 2122 (#3) in group C with which the failure-source sub-controller 2122 cooperates of the failure.

For example, when a failure has occurred in the sub-controller 2122 (#0) of the first group A, the failure notification part 2124 causes processing to stop by injecting a failure into the port controllers 2121 (#0) and 2121 (#1), and notifies the cooperation-destination sub-controllers 2122 (#2) and 2122 (#3) of the failure. When a failure has occurred in the sub-controller 2122 (#1) of the second group B, the failure notification part 2124 causes processing to stop by injecting a failure into the port controllers 2121 (#2) and 2121 (#3), and notifies the cooperation-destination sub-controllers 2122 (#2) and 2122 (#3) of the failure.

When a failure has occurred in any of the port controllers 2121 (#0) to 2121 (#3), the sub-controller 2122 that controls the failed port controller 2121 is notified of the failure.

FIG. 12 shows how processing is performed when a failure has occurred in one sub-controller 2122 while a command received from the host computer 4 is being processed in a shared manner by a plurality of sub-controllers 2122. In FIG. 12, an example is given of a case in which the one sub-controller 2122 (#0) is controlling one of the port controllers 2121 (#0), and processing a command in a cooperative manner with the other sub-controller 2122 (#1).

In Step S10, when a failure occurs in the sub-controller 2122 (#0), the sub-controller 2122 (#0) notifies the failure notification part 2124 to the effect that a failure has occurred as described in Steps S61 and S62 of FIG. 9.

The failure notification part 2124 detects the stop-target port controllers 2121 (#0) and the sub-controller 2122 (#1) using the failure countermeasures table T11. The failure notification part 2124 injects a failure into the stop-target sub-controller 2122 (#1) (S102), and also injects a failure into the stop-target port controller 2121 (#0).

The sub-controller 2122 (#1), upon detecting the injected failure (S104), stops command processing (S106). Upon detecting the injected failure (S105), the port controller 2121 (#0) also stops processing (S106).

As described above, in accordance with either a failure having occurred or a failure having been intentionally injected from outside, the sub-controllers 2122 (#0) and 2122 (#1), which are responsible for sharing command processing in the protocol chip 212, and the port controller 2121 (#0) respectively stop processing (S106).

The microprocessor 2411 (#0) associated with the sub-controller 2122 (#0), as described using FIG. 6, causes the read data to be transferred to the cache memory 231 in accordance with the read command received from the sub-controller 2122 (#0) prior to the failure. Upon finishing the staging process, the microprocessor 2411 (#0) issues a request to the sub-controller 2122 (#0) to send the read data on the cache memory 231 to the host computer 4 (S107). However, the sub-controller 2122 (#0) has stopped processing due to the failure having occurred. Therefore, the read data that the microprocessor 2411 (#0) was responsible for is not sent to the host computer 4.

Similarly, the microprocessor 2411 (#1) associated with the sub-controller 2122 (#1) also causes the read data to be transferred to the cache memory 231 in accordance with the read command received from the sub-controller 2122 (#1) prior to the failure being injected. Thereafter, the microprocessor 2411 (#1) issues a request to the sub-controller 2122 (#1) to send the read data on the cache memory 231 to the host computer 4 (S108). However, the sub-controller 2122 (#1) has stopped processing due to the failure having been injected from the failure notification part 2124. Therefore, the read data that the microprocessor 2411 (#1) was responsible for is not sent to the host computer 4.

The microprocessor 2411 can detect the fact that the sub-controller 2122 has stopped processing in accordance with a periodic diagnostic process S110 that is executed on a regular basis. In FIG. 12, a description is given using the microprocessor 2411 (#1) as an example, but the microprocessor 2411 (#0) also executes the periodic diagnostic process S110 in the same manner.

The microprocessor 2411 (#1), upon reaching a prescribed periodic diagnosis time period, issue a request to a prescribed sub-controller 2212 to send diagnostic information (S111). The prescribed sub-controller 2212 is a sub-controller 2122 in charge of port control and/or a sub-controller 2122 associated with the request-source microprocessor 2411. FIG. 12 shows a case in which the request to send the diagnostic information is issued to the sub-controller 2122 (#0) in charge of port control.

The sub-controller 2122 (#0), upon receiving a diagnostic information send request from the microprocessor 2411 (#1), collects the diagnostic information (S112) and sends this information to the microprocessor 2411 (#1) (S113). This makes it possible for the microprocessor 2411 (#1) to confirm that a failure occurred in the protocol chip 212 and that command processing could not end normally.

According to the present example, it is possible to shorten processing time since a plurality of command processes can be implemented in a parallel manner by pluralities of sub-controllers 2122 and microprocessors 2411.

However, when a failure has occurred in any of the plurality of sub-controllers 2122 that are performing processing in a shared manner, the sequence of the read data sent to the host computer 4 cannot be guaranteed. Thus, there is a danger of abnormal data being sent to the host computer 4.

Accordingly, in the present example, when a failure has occurred in a sub-controller 2122, a failure is injected into the other sub-controller 2122 related to port control. This makes it possible to stop all port control-related operations. Therefore, according to the present example, it is possible to prevent the sending of abnormal data to the host computer 4 after a failure has occurred.

In contrast to this, in the comparative example Steps S47 to S49 described using FIG. 6, a request is issued to the sub-controller 2122 to send the read data after a diagnosis of the sub-controller 2122 has been performed to confirm that a normal response was sent to the host computer 4.

Therefore, in the comparative example, the sub-controller 2122 must perform a diagnosis each time a data send request is executed for the host computer 4, and the time required for command processing increases. In the present example, each microprocessor 2411 can issue a request to a sub-controller 2122 to send data without concern for the state of the sub-controller 2122. The microprocessor 2411 needs only detect a failure that has occurred in a sub-controller 2122 by executing a periodic diagnostic process S110.

The present invention is not limited to the above-described embodiment. A person with ordinary skill in the art will be able to implement various additions and changes without departing from the scope of the present invention.

REFERENCE SIGNS LIST

1 Storage apparatus
2 Control unit (DKC)
3 Data storage unit (DKU)
4 Host computer
21 Channel adapter (CHA)
22 Disk adapter (DKA)
23 Memory part
24 Processor
212 Protocol chip
2121 Port controller
2122 Sub-controller
2123 Common connector
2124 Failure notification part

The invention claimed is:

1. A semiconductor integrated circuit for communication for communicating with a higher-level apparatus, comprising:
   a plurality of first circuit parts that are responsible for communications with the higher-level apparatus;
   a plurality of second circuit parts, which control a connection-destination first circuit part of the plurality of first circuit parts and analyze a command included in a series of communication processes carried out with the higher-level apparatus, and which share with another second circuit part the processing of a plurality of commands of the series of processes;
   a common connector for connecting the plurality of first circuit parts and the plurality of second circuit parts on the basis of a predetermined connection relationship; and
   a failure management part, which, when a failure has occurred in either the plurality of first circuit parts or the plurality of second circuit parts, detects from among the plurality of first circuit parts and the plurality of second circuit parts an associated circuit part associated with the failed circuit part, that is, a stop-target associated circuit part that must stop processing, and which causes the stoppage of processing by the detected stop-target associated circuit part.

2. The semiconductor integrated circuit for communication according to claim 1, wherein the failure management part causes command processing that is executed by the stop-target associated circuit part to stop by injecting a failure into the stop-target associated circuit part.

3. The semiconductor integrated circuit for communication according to claim 2, wherein the failure management part is disposed in the common connector.

4. The semiconductor integrated circuit for communication according to claim 3, wherein
   the common connector uses a prescribed table to connect the plurality of first circuit parts to the plurality of second circuit parts on the basis of the connection relationship,
   the prescribed table stores the connection relationship, information that shows an association between a circuit part, where a failure has occurred, and the associated circuit part, and information for identifying the stop-target associated circuit part, and
   the failure management part detects the stop-target associated circuit part by using the prescribed table.

5. The semiconductor integrated circuit for communication according to claim 4, wherein
   another associated circuit part of the associated circuit parts, besides the stop-target associated circuit part, is regarded as a notification-target associated circuit part, and
   the failure management part notifies the notification-target associated circuit part to the effect that a failure has occurred in a circuit part associated with the notification-target associated circuit part of the plurality of first circuit parts and the plurality of second circuit parts.

6. The semiconductor integrated circuit for communication according to claim 5, wherein, when a failure has occurred in any of the plurality of first circuit parts, the failure management part regards a second circuit part that is connected to the failed first circuit part as the notification-target associated circuit part of the plurality of second circuit parts, and notifies same to the effect that a failure has occurred.

7. The semiconductor integrated circuit for communication according to claim 5, wherein, when a failure has occurred in any of the plurality of second circuit parts, the failure management part regards a first circuit part that is connected to the failed second circuit part as the stop-target associated circuit part of the plurality of first circuit parts, and causes the stoppage of command processing.

8. The semiconductor integrated circuit for communication according to claim 7, wherein, in the plurality of second circuit parts,
   when a second circuit part has detected the occurrence of a failure, the second circuit part notifies the failure management part of the failure,
   when the detected failure is related to an internal program of the second circuit part, the second circuit part stops processing instantly, and
   when the detected failure is not related to an internal program of the second circuit part, the second circuit part stops processing when a failure is injected from the failure management part.

9. The semiconductor integrated circuit for communication according to claim 4, wherein
   a plurality of prescribed tables are provided, and any one of the plurality of prescribed tables is used selectively at a prescribed timing.

10. The semiconductor integrated circuit for communication according to claim 1, wherein
   the higher-level apparatus uses a storage area provided by a storage apparatus,
   the plurality of first circuit parts can be connected in a communicable manner to the higher-level apparatus via a communication network, and
   the plurality of second circuit parts can task a prescribed microprocessor, which is any of a plurality of microprocessors disposed in a storage apparatus, to execute a command received from the higher-level apparatus.

11. A storage apparatus for providing a storage area to a higher-level apparatus, comprising:

a first communication controller, which is for communicating with the higher-level apparatus, and which has a semiconductor integrated circuit for communication;
a second communication controller for communicating with a storage device;
a memory part that is used in the first communication controller and the second communication controller; and
a processor, which has a plurality of microprocessors, and which is for processing a command that the first communication controller received from the higher-level apparatus, and for reading/writing data from/to the storage device via the second communication controller, and moreover sending the command processing result to the higher-level apparatus from the first communication controller,
wherein the semiconductor integrated circuit for communication includes:
a plurality of first circuit parts that are responsible for communications with the higher-level apparatus;
a plurality of second circuit parts, which are for controlling a connection-destination first circuit part from among the plurality of first circuit parts and analyzing a command in an input/output request received from the higher-level apparatus, and which shares processing of a plurality of commands included in the input/output request with another second circuit part;
a common connector for connecting the plurality of first circuit parts to the plurality of second circuit parts on the basis of a predetermined connection relationship; and
a failure management part, which, when a failure has occurred either the plurality of first circuit parts or the plurality of second circuit parts, detects from among the plurality of first circuit parts and the plurality of second circuit parts an associated circuit part that is associated with the failed circuit part, that is, a stop-target associated circuit part that must stop processing, and which causes the stoppage of processing by the detected stop-target associated circuit part,
wherein the plurality of second circuit parts can task a prescribed microprocessor, which is any of the plurality of microprocessors, to execute a command received from the higher-level apparatus.

12. The storage apparatus according to claim 11, wherein the failure management part causes command processing that is executed by the stop-target associated circuit part to stop by injecting a failure into the stop-target associated circuit part.

13. The storage apparatus according to claim 12, wherein the common connector uses a prescribed table to connect the plurality of first circuit parts to the plurality of second circuit parts on the basis of the connection relationship,
the prescribed table stores the connection relationship, information that shows an association between a circuit part, where a failure has occurred, and the associated circuit part, and information for identifying the stop-target associated circuit part, and the failure management part, which is disposed in the common connector, and detects the stop-target associated circuit part by using the prescribed table.

14. The storage apparatus according to claim 13, wherein another associated circuit part of the associated circuit parts, besides the stop-target associated circuit part, is treated as a notification-target associated circuit part, and
the failure management part notifies the notification-target associated circuit part to the effect that a failure has occurred in a circuit part associated with the notification-target associated circuit part of the plurality of first circuit parts and the plurality of second circuit parts.

15. A method for managing a failure that occurs in a storage apparatus for providing a storage area to a higher-level apparatus,
the storage device including: a first communication controller, which is for communicating with the higher-level apparatus, and which has a semiconductor integrated circuit for communication; a second communication controller for communicating with a storage device; a memory part that is used in the first communication controller and the second communication controller; and a processor, which has a plurality of microprocessors, and which is for processing a command that the first communication controller received from the higher-level apparatus, and for reading/writing data from/to the storage device via the second communication controller, and moreover for sending the command processing result to the higher-level apparatus from the first communication controller,
the semiconductor integrated circuit for communication including: a plurality of first circuit parts that are responsible for communications with the higher-level apparatus; a plurality of second circuit parts, which are for controlling a connection-destination first circuit part of the plurality of first circuit parts and analyzing a command in an input/output request received from the higher-level apparatus, and which share processing of a plurality of commands included in the input/output request with another second circuit part; and a common connector for connecting the plurality of first circuit parts to the plurality of second circuit parts on the basis of a predetermined connection relationship,
the storage apparatus failure management method comprising:
monitoring for whether a failure has occurred in either the plurality of first circuit parts or the plurality of second circuit parts;
upon detecting the occurrence of a failure, detecting from among the plurality of first circuit parts and the plurality of second circuit parts an associated circuit part that is associated with the failed circuit part, that is, a stop-target associated circuit part that must stop processing; and causing the stoppage of processing by the detected stop-target associated circuit part.

* * * * *